UNITED STATES PATENT OFFICE.

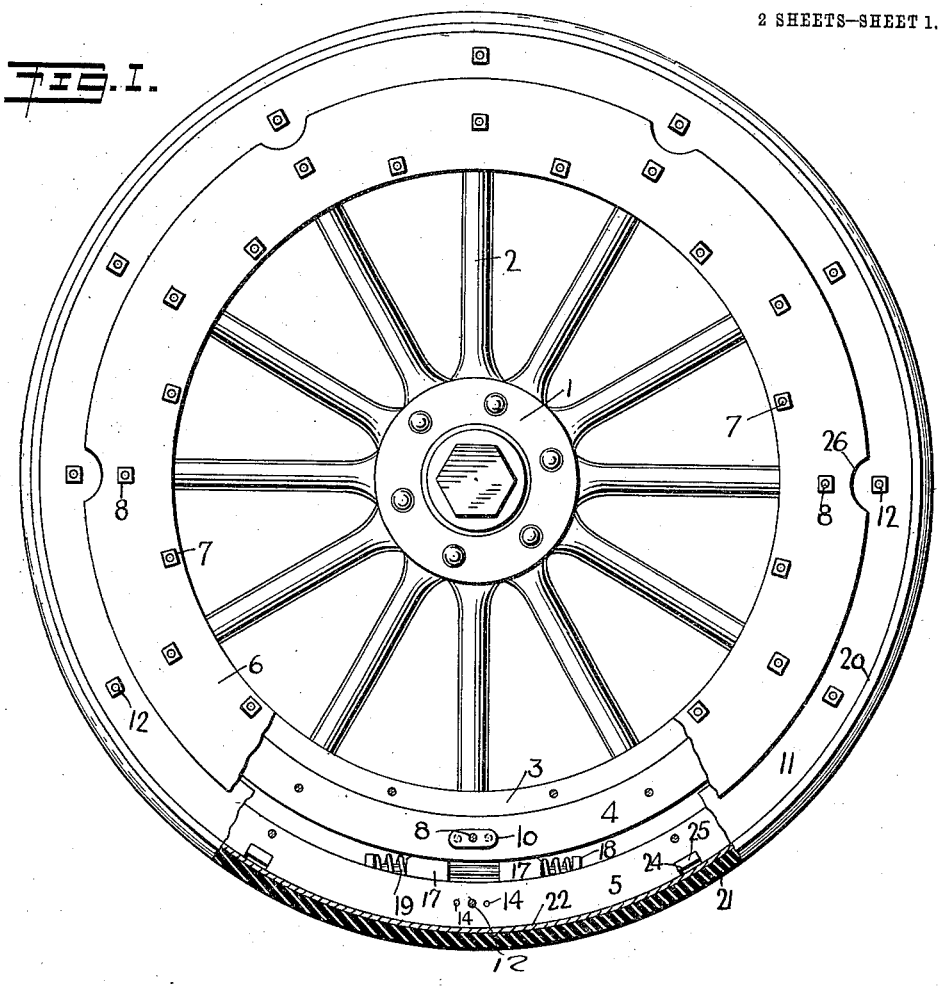
R. CURRY.
RESILIENT TIRE.
APPLICATION FILED DEC. 6, 1912.
1,083,059.
Patented Dec. 30, 1913.
2 SHEETS—SHEET 1.
FIG. 1.
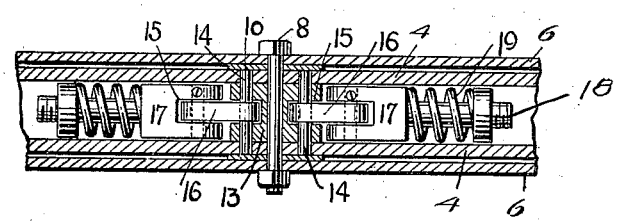
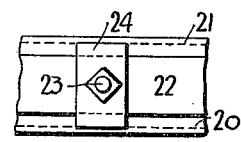
FIG. 5.
FIG. 6.
WITNESSES
G. Robert Thomas
Wm. F. Nickel
INVENTOR
Robert Curry
BY 
ATTORNEYS

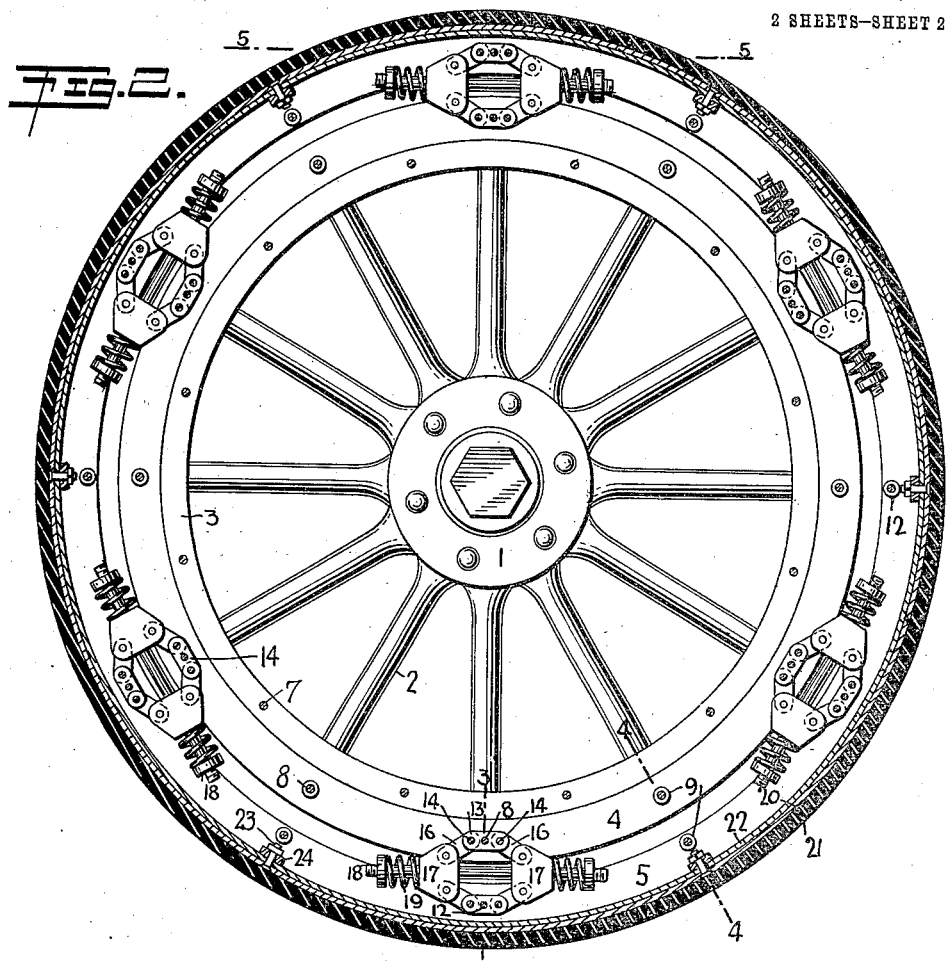

ROBERT CURRY, OF NEW YORK, N. Y.

RESILIENT TIRE.

1,083,059.    Specification of Letters Patent.    Patented Dec. 30, 1913.

Application filed December 6, 1912. Serial No. 735,235.

*To all whom it may concern:*

Be it known that I, ROBERT CURRY, a citizen of the United States, and a resident of the city of New York, borough of the Bronx, in the county and State of New York, have invented a new and Improved Resilient Tire, of which the following is a full, clear, and exact description.

My invention relates to an improvement in resilient tires for wheels of all classes of vehicles, and the object thereof is to do away with the necessity of using rubber tires, by providing a tire made up of parts of rigid material which are connected together so as to be movable with respect to one another, and so constructed that the same can be applied to almost any wheel now in use. The extent to which the principal parts of my tire are movable is regulated by cushioning devices or suitable resilient means which are introduced between the same, and the whole is suitably incased to guard against the intrusion of mud or dirt when the same is in service.

Reference is to be had to the accompanying drawings forming a part of this specification, in which the same characters of reference indicate the same parts in all the views.

Figure 1 is a side elevation showing my resilient tire in place, partly broken away to show the internal construction; Fig. 2 is a sectional view in the plane of a wheel to which my invention is applied, showing the cushioning devices and internal construction; Fig. 3 is a sectional view on the line 3—3 of Fig. 2; Fig. 4 is a sectional view on the line 4—4 of Fig. 2; Fig. 5 is a view taken on a horizontal line passing through the rivets of the inner casting and looking in an outward direction; Fig. 6 is a view of a detail.

My tire can be used on any form of wheel, or it can be made as part of a wheel especially constructed in accordance with my invention. Such a wheel will be provided with a hub 1 connected by means of spokes 2 to a rim 3, and on the outer face of this rim I secure a pair of bands 4. These bands extend in the plane of the wheel and are covered by means of bands 6 secured to the opposite sides of the rim by means of bolts 7. The bands 4 will be located inside of the bands 6 and secured thereto by means of bolts 8. These bolts will carry spacing washers 9 to hold the bands 4 apart, and spacing devices 10 to be located between the bands 4 and the adjacent bands 6, as shown particularly in Figs. 4 and 5. I also employ a pair of bands 5 which are arranged in the same plane as the bands 4 and are of larger diameter than the same, so as to provide a space between them. These bands are connected to the inner bands 4 by cushioning devices to be described later. They are also spaced apart by means of spacing washers 9 and are provided with cover bands 11, which have telescoping engagement with the cover bands 6, and the bands 5 and 11 are secured together by means of bolts 12. When the bands 11 are so located as to have their center in the axis of the wheel, their inner edges will overlap the outer edges of the band 6 around the entire circumference to the extent required for the purposes of my invention.

I connect the bands 4 and 5 by means of cushioning devices in the form of toggle joint levers, the movement of which is resisted by suitable springs to limit the extent to which the parts of the tire may yield in use. For this purpose I mount upon some of the bolts 8 and some of the bolts 12, suitable castings 13, which are secured to the bands 4 and 5 by means of rivets 14. These castings have recesses in their opposite ends, shown at 15, and the castings secured to the bands 4, as well as the castings secured to the bands 5, are united by means of links 16 to heads 17. The castings of each cushioning device are radially located with respect to each other, and each pair of castings for one of the cushioning devices will be connected to two of the heads 17, as shown in Fig. 2. These heads have bores therethrough to give passage to bolts 18, the ends of which have adjustable heads screw-threaded thereon, and between these heads and the heads 17 are springs 19. It will therefore be seen that these springs oppose the movement of the heads 17 when the vehicle is loaded, causing parts of the tire to yield. Each head 17 and the links joining the same to the castings 13 form a toggle joint, and the spring which engages the head limits the movement of the parts of the toggle joint. The cover bands 11 extend beyond the outer edges of the cover bands 5 and are encircled by means of a tread band 20 which engages their outer edges, this tread band having a wide groove therein to receive a tread 21, which may be of rubber or any resilient material.

Secured to the inner face of the tread band 21 and of less width than the same is another band 22, and this band carries blocks 24 extending across the same, the two bands and the blocks being secured together by suitable bolts 23. The ends of these blocks are received in suitable notches 25 in the outer edges of the bands 5, and it will be seen that when the nuts on the bolts 23 are screwed up these cross pieces 24 will hold the tread band 20 against lateral movement and prevent it from slipping off the bands 11.

The utility and operation of my tire will now be apparent. The bands 4 and the cover bands 6 are rigid with the rim 3, while the bands 5, the cover bands 11, tread band 20, with the inner band 22 and the blocks 24, are rigid with one another but movable with respect to the bands 4 and 6. The bands 4 and 6, together with the bands 5 and 11 and the tread band carried thereby, form a casing in two parts or sections, one part comprising the bands 4 and 6, making up the inner or fixed section, and the other part comprising the other bands, making up the outer or movable section. As many of the cushioning devices may be employed as conditions require. I have shown six on the drawings connecting the castings of each of these cushioning devices for alternate bolts 8 and 12. The bolts to which the cushioning devices are secured of course will not be provided with spacing sleeves or washers 9, these spacing sleeves being used only on the intervening bolts 8 and 12.

It will be observed that the outer section of the casing forming my resilient tire has telescoping engagement with the inner section, and the cover bands 6 overlap the outer face of the cover bands 11. This construction tends to prevent the entrance of dirt as the wheel revolves, since any dirt that might be thrown against the bands 6 and 11 will tend to drop off again rather than pass upward between these bands inside of the tire.

As stated above, my improved tire can be applied to an ordinary wheel, or I may specially construct wheels for vehicles on which the same is to be used. The cushioning device comprising the toggle levers gives great resiliency and strength with comparatively light materials. The effectiveness of the toggle joint is well known, and the properties of this mechanical device make it possible for me to use comparatively light springs to engage the head 17 in order to provide the necessary amount of resistance to the movement of the heads 17 away from each other. Furthermore, by making the tire in two sections, one of which telescopes within the other, as shown, my invention is not only enabled to bear the weight of the vehicle and the load thereon, but can also resist the lateral thrust of the axle when the vehicle turns, without deformation or breakage. I may also provide notches 26 in the outer edge of the cover bands 6 opposite the heads and nuts on the bolts 12, otherwise these bands might damage these bolts. These recesses 26 will be as many in number as will be required. In Fig. 1 I have shown them as being arranged only adjacent those of the bolts 12, which are comparatively near to the outer edges of the bands 6. If any of these bolts, as shown in Fig. 1, are farther away from the edges of these bands 6, it will not be necessary to cut a recess near them. Of course these recesses may be placed opposite all of the bolts 12 if desired.

I wish to have it understood that the above description is illustrative only, and I do not care to be restricted to the exact details of the invention shown and described, but reserve to myself the right to make such changes in the shape, size and arrangement of the parts as fairly fall within the scope and spirit of my invention.

Having thus described my invention, I claim as new and desire to secure by Letters Patent:

1. In an improvement of the kind described, the combination of a fixed rim, a rim movable relatively thereto and normally spaced therefrom, a plurality of pairs of heads each of the heads being provided with an opening, the heads being spaced apart between the rims, a pair of links connected to each head and diverging radially therefrom, means for anchoring a link of each of the pairs of links relatively to the fixed rim, and means for anchoring the other links relatively to the other rim, bolts passing loosely through the said heads and having adjustable means thereon, and resilient means encircling said rods and engaging said means, and said heads, to oppose the movement of the heads away from each other when the other ends of the links are forced toward each other, the heads in each pair and the resilient means connected therewith being free to move relatively to the other heads and the resilient means connected therewith.

2. In an improvement of the kind described, a wheel rim, a pair of bands secured to the sides of the wheel rim and extending beyond the rim, a tread, a pair of bands secured at their outer edges to the tread and having telescopic engagement with the first pair of bands, a plurality of pairs of heads, each of the heads having an opening therethrough, the pairs of heads being spaced apart between the rim and the tread, a pair of links connected to each head and diverging radially therefrom, means for anchoring a link of each of the pairs of links relatively to the rim, means for anchoring the other links relatively to the tread, a plurality of bolts each bolt being disposed through one pair of heads, the bolts having adjustable means thereon, and resilient means encircling said bolts and engaging said means, and said heads, to oppose the movement of the heads away from each other when the outer ends of the links are forced toward each other, each pair of heads and the resilient means thereon being free to move relatively to the other heads and the resilient means thereon.

3. In an improvement of the kind described, the combination of a pair of bands encircling a wheel rim and of larger diameter than the same, means for spacing said bands apart, a pair of cover bands secured relatively to the first-named bands and spaced therefrom, the cover bands extending beyond the edges of the first-mentioned bands, a tread, bands secured to the tread and engaging the inner sides of the cover bands, and adapted to move between the first bands and the cover bands, a plurality of pairs of heads disposed between the rim and the tread, each of the heads having a longitudinal opening therethrough, a pair of links connected to each head and diverging radially therefrom, means for anchoring a link of each of the pairs of links relatively to the rim, means for anchoring the other links relatively to the tread, a plurality of rods one of which is disposed through each pair of heads, the rods having adjustable means thereon, and resilient means encircling said rods, and engaging said means and said heads, to oppose the movement of the said heads away from each other when the outer ends of the links are forced toward each other, the heads in each pair and the resilient means thereon being free to move relatively to the other heads, and resilient means thereon.

4. In an improvement of the kind described, the combination of a pair of rims one disposed within and spaced from the other, a pair of heads with openings and disposed between the rims, a pair of links connected to each head, means for anchoring the outer ends of the links to the rims, a rod passing loosely through openings in said heads and having adjustable means thereon, and resilient means encircling said rod and engaging said means and said heads to oppose the movement of the heads away from each other when the outer ends of the links are forced toward each other.

5. In an improvement of the kind described, the combination of a fixed rim, a rim movable relatively thereto and normally spaced therefrom, a plurality of pairs of heads each of the heads being provided with an opening, the heads being spaced apart between the rims, links connected with the heads and diverging therefrom, means for anchoring the links relatively to the rims, bolts with heads passing loosely through the said heads, and resilient means for encircling said bolts and engaging the heads of the bolts and the first mentioned heads, to oppose the movement of the first mentioned heads away from each other when the links, at a distance from the first mentioned heads, are forced toward each other, each pair of heads and the resilient means connected therewith being free to move relatively to the other pairs of heads and the resilient means connected therewith.

In testimony whereof I have signed my name to this specification in the presence of two subscribing witnesses.

ROBERT CURRY.

Witnesses:
WILLIAM F. NICKEL,
PHILIP D. ROLLHAUS.

Copies of this patent may be obtained for five cents each, by addressing the "Commissioner of Patents, Washington, D. C."